United States Patent
McCormack

[11] 3,804,523
[45] Apr. 16, 1974

[54] RADIUSCOPE THICKNESS ADAPTOR

[75] Inventor: Harley G. McCormack, Elgin, Ill.

[73] Assignee: American Hydrophilics Corporation, Elgin, Ill.

[22] Filed: Sept. 29, 1972

[21] Appl. No.: 293,407

[52] U.S. Cl. .................. 356/124, 356/161, 356/156
[51] Int. Cl. .............................................. G01b 9/00
[58] Field of Search ........... 356/124, 125, 126, 127, 356/161, 156; 350/80, 92, 160; 351/178, 177

[56] References Cited
UNITED STATES PATENTS
| | | | |
|---|---|---|---|
| 3,430,391 | 3/1969 | Borish | 351/177 |
| 3,019,708 | 2/1967 | French, Jr. et al. | 356/125 |
| 2,607,270 | 8/1952 | Briggs | 350/84 |

Primary Examiner—Ronald L. Wibert
Assistant Examiner—Conrad Clark
Attorney, Agent, or Firm—Olson, Trexler, Wolters, Bushnell & Fosse, Ltd.

[57] ABSTRACT

The embodiment of the invention disclosed herein is directed to a radiuscope thickness adaptor to be positioned on a support bed of a radiuscope for detecting the thickness of flexible hydrophilic lenses. The radiuscope thickness adaptor is formed of a base member arranged for positioning on the support bed of the radiuscope. A hemispherical polished radius tool element is positioned on the base to be in direct view through the radiuscope. To determine the thickness of a flexible hydrophilic lens a first reading is taken from the surface of the radius tool and then a second reading is taken from the surface of the lens being measured, and the difference between these two measurements is the thickness of the lens.

4 Claims, 7 Drawing Figures

PATENTED APR 16 1974  3,804,523

SHEET 2 OF 2 though to focus upon the surface of the lens. The distance between the initial focusing and the second focusing at the lens surface determines the

RADIUSCOPE THICKNESS ADAPTOR

BACKGROUND OF THE INVENTION

This invention relates to an adaptor unit for use with a radiuscope measuring instrument which measures the radii of curvature of the surfaces of a non-flexible contact lens. When using the thickness adaptor with a radiuscope, the thickness of flexible hydrophilic lenses are measured accurately.

Heretofore, measurement of the thickness of a non-flexible contact lens has been accomplished by the use of an instrument known as a standard industrial dial gauge affixed to a bench base.

As the result of the recent development in flexible hydrophilic lenses a new procedure of measuring the thickness of contact lenses is needed. Due to the compressibility of the material which forms the flexible hydrophilic lens, conventional thickness gauges are no longer of use to obtain accurate readings.

An instrument known as a radiuscope has been in general use for the measurement of the radius of curvature of both the convex and concave surfaces of a non-flexible contact lens. The measurement is possible due to an optical principle of focusing upon the surface of the lens, and using a dial gauge to provide a direct readout of the measurement.

SUMMARY OF THE INVENTION

Accordingly, it is an object of this invention to provide a radiuscope thickness adaptor for use with a conventional radiuscope so that the thickness of flexible hydrophilic lenses can be obtained quickly and accurately.

Briefly, the radiuscope thickness adaptor of this invention consists of two parts, a black plexiglass stand or base element and a clear lucite radius tool. The black flexible stand element is designed to fit over the support stage of the radiuscope so that it is in registry with the viewing lens. The radius tool is inserted into the base and has a radius of curvature of approximately 7.5mm. This dimension is selected so that the radius of the sphere will always be less than the radius of curvature of the concave surface of the lens being measured thereby providing an apical touch to the central portion of the concave surface of the lens to the radius tool.

When utilizing the radiuscope thickness adaptor it is placed over the stage of the radiuscope underneath the viewing element. The instrument is then sharply focused upon the surface of the clear lucite radius tool. With this focus setting the dial or readout of the radiuscope is zero or a direct reading is noted. The lens to be measured is then placed on top of the spherical tool and the radiuscope refocused upon the upper surface of the lens. The distance between the initial focusing the second focusing at the lens surface determines the thickness of the lens being measured. To insure proper measurement of the thickness of the lens it is thoroughly hydrated with a saline solution which corresponds to the moisture found on the surface of the eye when the contact lens is in position.

Accordingly, many other objects, features and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENT

Figure 1:
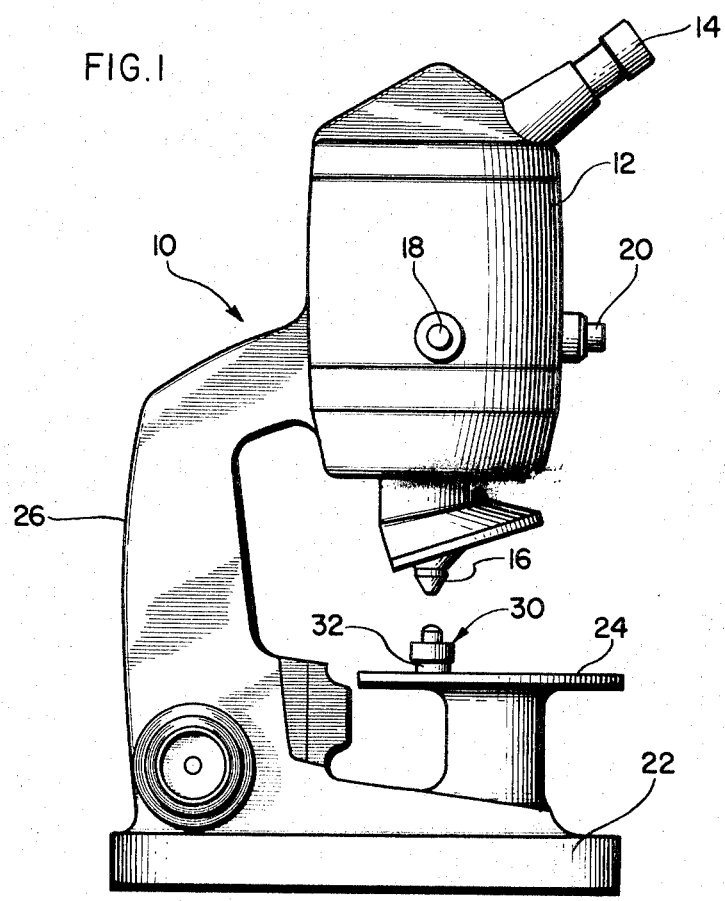
FIG. 1 is a side elevational view of a radiuscope used to measure the radii of curvature of the surfaces of contact lenses.

Referring now to FIG. 1 there is seen a radiuscope designated generally by reference numeral 10. The radiuscope is here shown only by way of example and can be any instrument suitable for the purpose intended. The radiuscope is used to measure the radius of curvature of contact lenses in a well-known manner and includes an optical lens support housing 12 into which are mounted a plurality of lens and mirror elements. An eyepiece 14 is provided at the top of the housing 12 for viewing therein. At the bottom of the housing is positioned a focusing lens 16 which is positioned over and spaced from the object to be measured. An adjusting knob 18 is provided on the housing 12 and a calibrating or dial-setting control 20 is also provided to make adjustments and to provide direct readout of the measurement.

The radiuscope 10 includes a bottom support plate 22 upon which rests a base 24 to receive a contact lens when it is to have the radius of curvature measured. An upstanding support arm 26 joins the bottom support plate 22 with the lens support housing 12.

Most advantageously, a radiuscope thickness adaptor 30 is positioned over a pedestal 32 located on the base 24. The pedestal 32 is positioned in registry with the focusing lens 16 so that placing of a contact lens thereon will quickly and accurately locate the lens in the viewing area of the radiuscope. The radius thickness adaptor 30 thus positioned will allow the thickness of flexible hydrophilic lenses to be measured.

Figure 2:
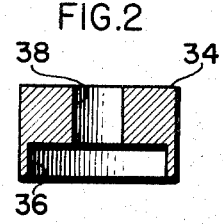
FIG. 2 is an enlarged sectional view through a base element of the radiuscope thickness adaptor of this invention.
Figure 3:
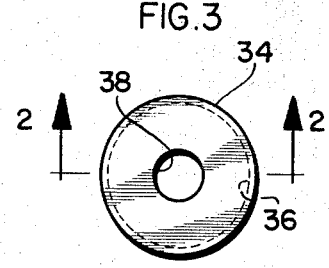
FIG. 3 is a top view of the base of FIG. 2.

FIGS. 2 and 3 illustrate one component of the thickness adaptor 30. Here a support stand 34 is formed of a light-absorbing material such as, for example, black plexiglass, and includes an annular recess 36 formed at the bottom thereof and a bore 38 extending from the top of the body 34 and extending downwardly into the recess 36. The dimension of the annular recess is such so as to fit firmly upon the pedestal 32 so that little lateral deviation is encountered when placing the adaptor of this invention upon the radiuscope.

Figure 4:
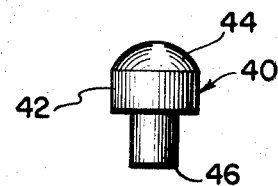
FIG. 4 is an enlarged elevational view of a radius tool used with the base of FIG. 2.
Figure 5:
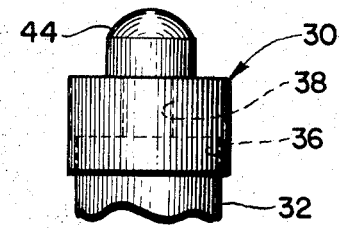
FIG. 5 is an assembled view showing the base and radius tool positioned on top of the support stage of the radiuscope of FIG. 1.

Referring now to FIG. 4 there is seen a radius tool designated generally by reference numeral 40 and preferably is formed of a light reflective material such as, for example, clear lucite. The clear lucite radius tool 40 has a body portion 42 upon which is formed a crown 44 substantially hemispherical in configuration and which is highly polished. Extending downwardly from the body is a stem portion 46 which is inserted into the bore 38 of the support element 34, FIG. 2. This assembled configuration is best illustrated in FIG. 5 which shows the adaptor 30 positioned upon the pedestal 32 so that the annular recess 36 receives the pedestal. The highly polished crown portion 44 is then positioned immediately beneath the focusing lens 16, FIG. 1, when in use.

Figure 6:
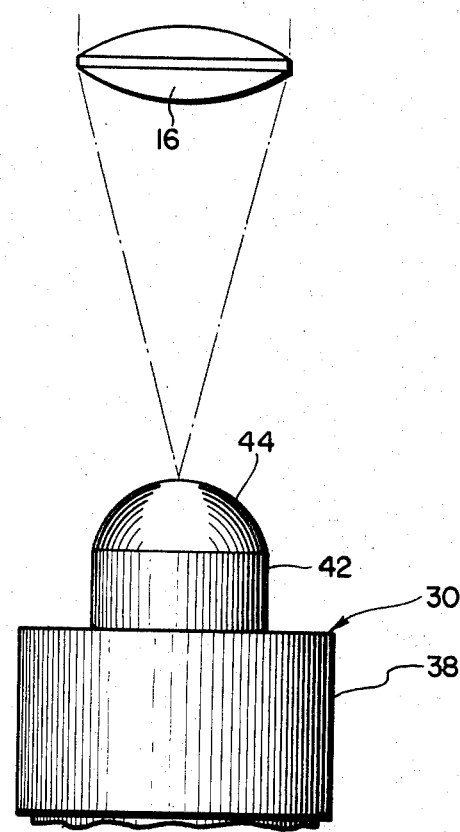
FIG. 6 illustrates the method of taking an initial reading of the radius tool.
Figure 7:
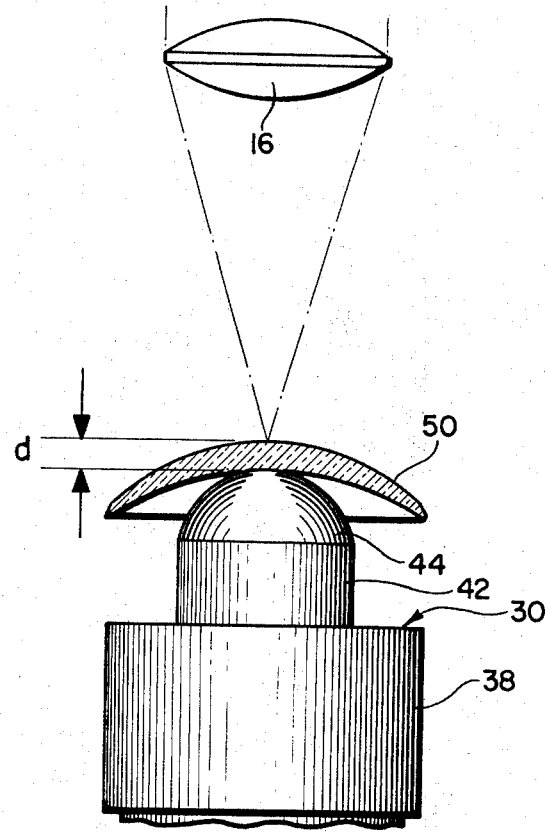
FIG. 7 illustrates a second reading to determine the thickness of a flexible hydrophilic lens.

FIGS. 6 and 7 illustrate the method of using the radiuscope thickness adaptor of this invention. First the adaptor is positioned upon the pedestal 32 and a focusing adjustment is made so that the radiuscope 10 is accurately focused upon the surface of the crown 44, as shown in FIG. 6. Subsequently a flexible hydrophilic lens 50 is positioned upon the crown 44, as shown in FIG. 7, to have the concave surface thereof in apical contact therewith. The radiuscope is then adjusted a second time to cause focusing upon the top surface of the lens. The difference between the first focusing adjustment and the second focusing adjustment is indicated by the reference letter D which is obtained either by direct readout on the radiuscope or by substracting one reading from another reading on a dial or the like. This then gives an accurate indication of the thickness of the flexible hydrophilic lens.

While only a single embodiment of the radiuscope thickness adaptor has been illustrated herein, it will be understood that other variations and modifications of this invention may be effected without departing from the spirit and scope of the novel concepts disclosed and claimed herein.

The invention is claimed as follows:

1. A radiuscope thickness adaptor to be positioned on a support bed of a radiuscope for detecting the thickness of flexible hydrophilic lenses, comprising: a base arranged for positioning on the support bed of a radiuscope, and a radius tool element extending upwardly from said base, said radius tool element having a radius of curvature less than the radius of curvature of the flexible hydrophilic lenses being measured and providing an apical touch to the central portion of the concave surface of the lenses when mounted on the radius tool element.

2. The radiuscope thickness adaptor according to claim 1 wherein said base is formed of light-absorbing material, and said radius tool element is formed of light reflective material.

3. The radiuscope thickness adaptor according to claim 2 wherein said base is formed of black plexiglass, and said radius tool element is formed of clear lucite.

4. The radiuscope thickness adaptor according to claim 1 wherein said base includes an annular recess formed therein, and a bore extending from the top of the base into said annular recess, said radius tool element having a body portion upon which is formed a crown having said desired radius of curvature, and a stem having a cylindrical configuration to be inserted into the bore of said base.

* * * * *